(12) United States Patent
Sun et al.

(10) Patent No.: US 12,510,900 B2
(45) Date of Patent: Dec. 30, 2025

(54) WORKFLOW MANAGEMENT SYSTEM

(71) Applicant: TuSimple, Inc., San Diego, CA (US)

(72) Inventors: Lindong Sun, San Diego, CA (US); Yidi Zhang, San Diego, CA (US); Song Wang, San Diego, CA (US); Chang Joon Rhee, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 395 days.

(21) Appl. No.: 18/171,772

(22) Filed: Feb. 21, 2023

(65) Prior Publication Data
US 2023/0205228 A1 Jun. 29, 2023

Related U.S. Application Data

(63) Continuation of application No. 16/656,494, filed on Oct. 17, 2019, now Pat. No. 11,609,580.

(51) Int. Cl.
G05D 1/00 (2024.01)
G06F 9/48 (2006.01)
G06F 16/22 (2019.01)
G07C 5/00 (2006.01)
G07C 5/08 (2006.01)

(52) U.S. Cl.
CPC ......... *G05D 1/0297* (2013.01); *G05D 1/0027* (2013.01); *G06F 9/4881* (2013.01); *G06F 16/22* (2019.01); *G07C 5/008* (2013.01); *G07C 5/085* (2013.01)

(58) Field of Classification Search
CPC .. G05D 1/0297; G05D 1/0027; G06F 9/4881; G06F 16/22; G07C 5/008; G07C 5/085; G06Q 10/0631
See application file for complete search history.

(56) References Cited

U.S. PATENT DOCUMENTS 9,646,428 B1 5/2017 Konrardy et al.
2006/0009879 A1 1/2006 Lynch et al.
(Continued)

FOREIGN PATENT DOCUMENTS

WO 2018217526 A1 11/2018

OTHER PUBLICATIONS

Extended European Search Report for European Patent Application No. 20201598.8, mailed Nov. 16, 2020.

*Primary Examiner* — Aaron L Troost
(74) *Attorney, Agent, or Firm* — Perkins Coie LLP

(57) ABSTRACT

A workflow management system is described to manage tasks to be performed with vehicles. The workflow management system includes a workflow management server and a computer located in a vehicle. The workflow management server generates and sends to the computer a record that describes a task to be performed with a vehicle. The task may include collecting sensor data from one or more sensors on the vehicle, or performing a vehicle driving test using an updated operating system to be used by the vehicle. The record can include a starting location and a destination of a route on which the vehicle is to perform the task. The computer receives the record, executes an operating system of the vehicle to perform the task, determines that the task is completed, and sends to a database a record status information that indicates that the task is completed.

20 Claims, 4 Drawing Sheets

(56) References Cited

U.S. PATENT DOCUMENTS

| | | |
|---|---|---|
| 2014/0046590 A1 | 2/2014 | Needham et al. |
| 2015/0324735 A1* | 11/2015 | Lord .................... G06Q 10/083 |
| | | 705/330 |
| 2017/0023947 A1 | 1/2017 | Mcmillion |
| 2017/0357270 A1 | 12/2017 | Russell |
| 2018/0211347 A1 | 7/2018 | Chen et al. |
| 2019/0004528 A1 | 1/2019 | Zhan et al. |
| 2019/0196505 A1 | 6/2019 | High et al. |
| 2019/0227569 A1 | 7/2019 | Weslosky et al. |
| 2021/0011693 A1 | 1/2021 | Williamson et al. |
| 2021/0201230 A1* | 7/2021 | Duffy .................... G05D 1/247 |

\* cited by examiner

WORKFLOW MANAGEMENT SYSTEM

CROSS-REFERENCE TO RELATED APPLICATIONS

This application is a continuation of U.S. patent application Ser. No. 16/656,494, filed on Oct. 17, 2019. The aforementioned application of which is incorporated by reference in its entirety.

TECHNICAL FIELD

This document relates to workflow process management system for vehicle operations.

BACKGROUND

A workflow management system can enable companies or organizations to manage a set of tasks. For example, when a software developer identifies an issue with a released software, the software developer may initiate a process to debug and re-release an improved version of that software. The software developer may use a workflow management system software to identify the nature of the issue with the released software. After the software developer has debugged the software, the software can be tested, and the workflow management system is used to review and approve the updated software. Thus, a workflow management system can enable a company or organization to manage its processes.

SUMMARY

An exemplary workflow management system is described to manage tasks to be performed with vehicles. For example, a system for managing vehicle operation comprises a workflow management server that can generate and send a record to a computer operating in a vehicle, where the computer performs a task associated with the record.

The workflow management server comprises a first memory that stores instruction code and a first processor in communication with the first memory, the first processor operable to execute the instruction code to implement a method comprising: generating a record that describes a task to be performed with a vehicle, the record includes a first set of information that includes a starting location and a destination of a route on which the vehicle is to perform the task, adding to the record a second set of information that indicate resources to perform the task, where the second set of information includes a unique identifier of the vehicle, receiving an indication that the record is complete, and sending, after the receiving, the record to a computer located in the vehicle.

The computer located in the vehicle comprise a second memory that stores instruction code and a second processor in communication with the second memory, the second processor operable to execute the instruction code to implement another method comprising: receiving the record that describes the task; executing an operating system of the computer to perform the task, where the operating system is executed to operate the vehicle to drive towards the destination indicated in the record; determining that the task is completed; and sending, to a database and after the determining that the task is completed, a record status information that indicates that the task associated with the record is completed.

In some embodiments, the first set of information further includes a type of the record that indicates that the task relates to collecting sensor data, and one or more sensors on the vehicle identified for data collection, where the second processor operable to execute the instruction code to implement another method further comprises: upon determining, from the type of record, that the task relates to collecting sensor data: recording data from the one or more sensors indicated in the record while the vehicle is driven towards the destination; and uploading the recorded data to the database.

In some embodiments, where the record includes an identification of the operating system to be used by the vehicle to perform the task, where the operating system indicated in the record is a revised operating system, where the first set of information further includes a type of the record that indicates that the task relates to performing a driving test using the operating system indicated in the record, and where the second processor operable to execute the instruction code to implement another method further comprises: upon determining, from the type of record, that the task relates to performing a driving test using the operating system indicated in the record: obtaining the operating system indicated in the record before executing the operating system.

In some embodiments, the first processor of the workflow management server is operable to implement the method that further comprises: determining, from a plurality of vehicles, one or more vehicles capable of performing the task, where the one or more vehicles are determined based on a comparison of the first set of information with attributes of the plurality of vehicles or based on a health status information indicative of a condition of each of the plurality of vehicles, and where the vehicle is added to the record from the determined one or more vehicles.

In some embodiments, the second set of information further includes one or more enable or disable information that respectively indicates to the computer to enables or disables one or more sensors in the vehicle, and the second processor operable to execute the instruction code to implement another method further comprises: enabling or disabling one or more sensors of the vehicle based on the one or more enable or disable information.

In some embodiments, the second processor operable to execute the instruction code to implement another method further comprises: sending, to the database and after the determining that the task is completed, health information of devices located on or in the vehicle. In some embodiments, the second set of information further includes either a time when the task is to be performed or a range of time period within which the task is to be performed. In some embodiments, the second set of information further includes a driver to manage the vehicle. In some embodiments, the task is determined to be completed in response to determining that a position of the vehicle is within a pre-determined distance of the destination indicated in the record. In some embodiments, the operating system is obtained by the computer in response to the computer receiving a second indication to perform the task associated with the record.

In an exemplary embodiment a method for managing vehicle operation comprises receiving, by a computer located in a vehicle, a record that describes a task to be performed with the vehicle, where record includes a first set of information that includes a starting location and a destination of a route on which the vehicle is to perform the task, where the record includes a second set of information that indicate resources to perform the task, and where the second set of information includes a unique identifier of the vehicle; executing an operating system of the computer to perform the task, where the operating system is executed to operate the vehicle to drive towards the destination indicated in the record; determining that the task is completed; and sending, to a database and after the determining that the task is completed, a record status information that indicates that the task associated with the record is completed.

In some embodiments, where the first set of information further includes a type of the record that indicates that the task relates to collecting sensor data, and one or more sensors on the vehicle identified for data collection, and where the method further comprises: upon determining, from the type of record, that the task relates to collecting sensor data: recording data from the one or more sensors indicated in the record while the vehicle is driven towards the destination; and uploading the recorded data to the database.

In some embodiments, where the record includes an identification of the operating system to be used by the vehicle to perform the task, where the operating system indicated in the record is a revised operating system, where the first set of information further includes a type of the record that indicates that the task relates to performing a driving test using the operating system indicated in the record, and where the method further comprises: upon determining, from the type of record, that the task relates to performing a driving test using the operating system indicated in the record: obtaining the operating system indicated in the record before executing the operating system.

In some embodiments, the method further comprises determining, from a plurality of vehicles, one or more vehicles capable of performing the task, where the one or more vehicles are determined based on a comparison of the first set of information with attributes of the plurality of vehicles or based on a health status information indicative of a condition of each of the plurality of vehicles, and where the vehicle is added to the record from the determined one or more vehicles.

In some embodiments, where the second set of information further includes one or more enable or disable information that respectively indicates to the computer to enables or disables one or more sensors in the vehicle, and where the method further comprises: enabling or disabling one or more sensors of the vehicle based on the one or more enable or disable information. In some embodiments, the method further comprises sending, to the database and after the determining that the task is completed, health information of devices located on or in the vehicle. In some embodiments, the operating system is obtained by the computer in response to the computer receiving an indication to perform the task associated with the record.

In yet another exemplary aspect, the above-described method is embodied in the form of processor-executable code and stored in a computer-readable program medium. The computer readable program is stored on a non-transitory computer readable media, the computer readable program including code that when executed by a processor, causes the processor to implement the methods described in this patent document.

In yet another exemplary embodiment, a device that includes a processor that is configured or operable to perform the above-described methods is disclosed.

The above and other aspects and their implementations are described in greater detail in the drawings, the descriptions, and the claims.

DETAILED DESCRIPTION

A workflow management system can provide an effective solution to manage tasks in corporate or other environments. For instance, a workflow management system can allow employees to perform an ordered set of tasks to achieve a desired result, where each employee can perform a task that corresponds to his or her identified role in a company. Thus, a workflow management system can be used to formalize a set of rules or processes to achieve a desired outcome. A company or organization may also use a workflow management system to operate efficiently. For instance, a software engineering department in a company may include subgroups where each group has a clearly identified role, such as software development or software testing. In this example, a workflow management system can manage the flow of information between the software development team and the software testing team so that both teams can operate with each other at an optimal efficiency while accomplishing their respective tasks.

Conventional workflow management system software provides inadequate technical resources to manage operations related to autonomous vehicles. In a conventional workflow management system software, resources such as an airplane or a semi-trailer truck in a fleet can be scheduled for use without considering how such resources may be operated to achieve a desired result. For example, a conventional workflow management system software may receive an order from a customer to deliver goods and may randomly select a semi-trailer truck to deliver those goods to a desired destination. However, a conventional workflow management system software is not designed to provide technical information to instruct the hardware and/or software on the semi-trailer truck so that the semi-trailer truck can operate at an optimal setting to achieve a particular result. This patent document describes an exemplary workflow management system that can be used to manage tasks related to autonomous vehicle for testing and development or for commercial applications.

Figure 1:
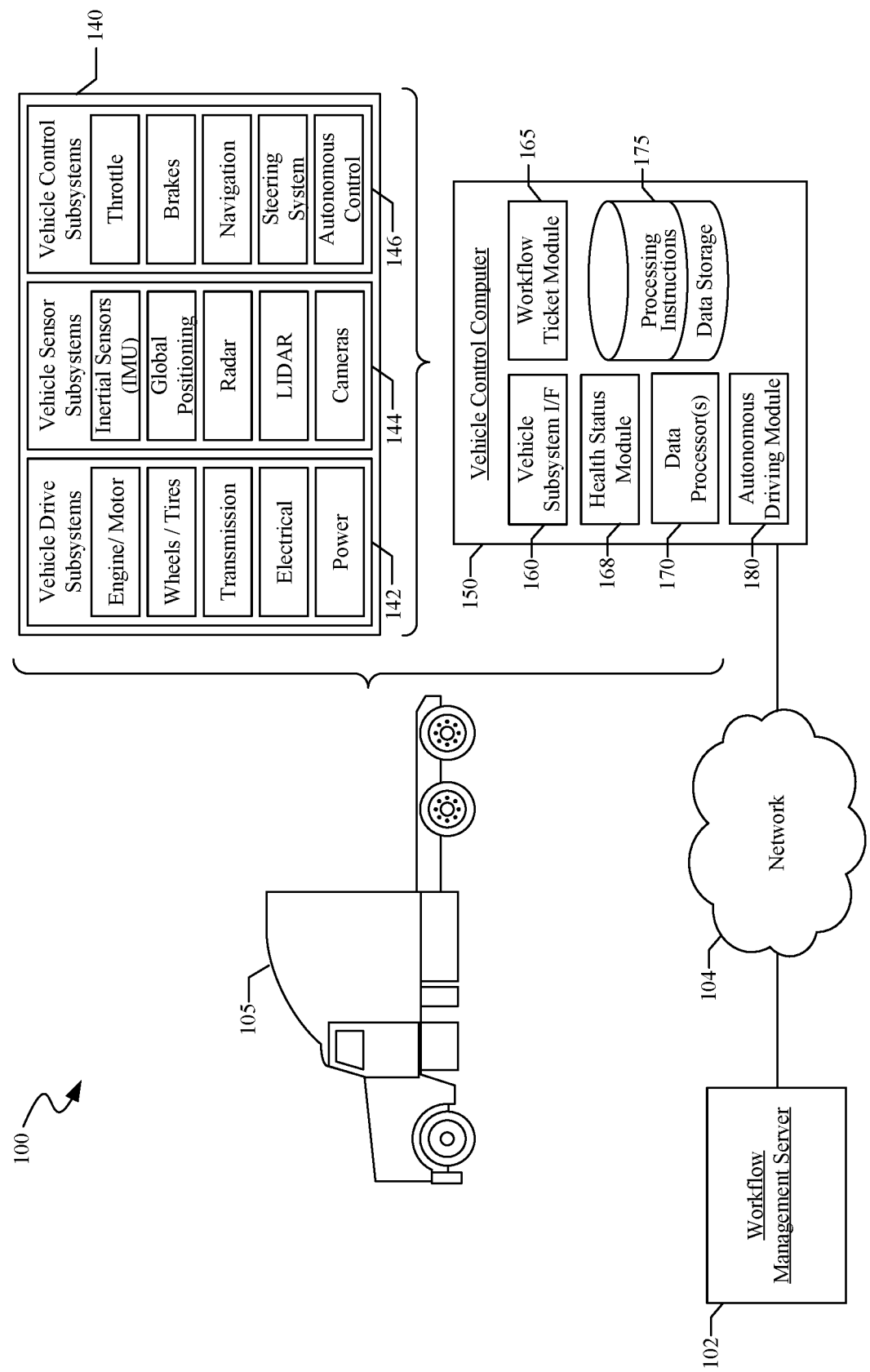
FIG. 1 shows an exemplary workflow management system to manage autonomous vehicle operations.

FIG. 1 shows an exemplary workflow management system 100 to manage autonomous vehicle operations. The workflow management system 100 includes an autonomous vehicle 105 and a workflow management server 102 that can manage operations related to the autonomous vehicle 105. Examples of autonomous vehicle 105 include a car, a truck, or a semi-trailer truck. The workflow management server 102 can communicate with a vehicle control computer 150 that is located in the autonomous vehicle 105 via the network 104 (e.g., a wired network or a wireless network). For ease of description, FIG. 1 shows a single autonomous vehicle 105 with a vehicle control computer 150 in communication with the workflow management server 102. The workflow management server 102 can manage operations related to a fleet of autonomous vehicles by communicating with multiple vehicle control computers in multiple autonomous vehicles.

The vehicle control computer 150 can be in data communication with a plurality of vehicle subsystems 140, all of which can be resident in the autonomous vehicle 105. A vehicle subsystem interface 160 is provided to facilitate data communication between the vehicle control computer 150 and the plurality of vehicle subsystems 140.

The autonomous vehicle 105 may include various vehicle subsystems that support of the operation of autonomous vehicle 105. The vehicle subsystems may include a vehicle drive subsystem 142, a vehicle sensor subsystem 144, and/or a vehicle control subsystem 146. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment or condition of the autonomous vehicle 105. For example, the vehicle sensor subsystem 144 may include an inertial measurement unit (IMU), a Global Positioning System (GPS) transceiver, a RADAR unit, a laser range finder/LIDAR unit, and/or one or more cameras or image capture devices. The vehicle sensor subsystem 144 may also include sensors configured to monitor internal systems of the autonomous vehicle 105 (e.g., an $O_2$ monitor, a fuel gauge, an engine oil temperature).

The IMU may include any combination of sensors (e.g., accelerometers and gyroscopes) configured to sense position and orientation changes of the autonomous vehicle 105 based on inertial acceleration. The GPS transceiver may be any sensor configured to estimate a geographic location of the autonomous vehicle 105. For this purpose, the GPS transceiver may include a receiver/transmitter operable to provide information regarding the position of the autonomous vehicle 105 with respect to the Earth. The RADAR unit may represent a system that utilizes radio signals to sense objects within the local environment of the autonomous vehicle 105. In some embodiments, in addition to sensing the objects, the RADAR unit may additionally be configured to sense the speed and the heading of the objects proximate to the autonomous vehicle 105. The laser range finder or LIDAR unit may be any sensor configured to sense objects in the environment in which the autonomous vehicle 105 is located using lasers. The cameras may include one or more devices configured to capture a plurality of images of the environment of the autonomous vehicle 105. The cameras may be still image cameras or motion video cameras.

The vehicle control system 146 may be configured to control operation of the autonomous vehicle 105 and its components. Accordingly, the vehicle control system 146 may include various elements such as a throttle, a brake unit, a navigation unit, a steering system and/or an autonomous control unit.

The throttle may be configured to control, for instance, the operating speed of the engine and, in turn, control the speed of the autonomous vehicle 105. The brake unit can include any combination of mechanisms configured to decelerate the autonomous vehicle 105. The brake unit can use friction to slow the wheels in a standard manner. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS transceiver and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

Many or all of the functions of the autonomous vehicle 105 can be controlled by the vehicle control computer 150. The vehicle control computer 150 may include at least one data processor 170 (which can include at least one microprocessor) that executes processing instructions stored in a non-transitory computer readable medium, such as the data storage device 175 or memory. The non-transitory computer readable program includes code that when executed by the at least one data processor 170, causes the processor 170 to perform the operations associated with the vehicle control computer 150, the vehicle subsystem interface 160, the workflow ticket module 165, health status module 168, and the autonomous driving module 180 as described in this patent document. The vehicle control computer 150 may also represent a plurality of computing devices that may serve to control individual components or subsystems of the vehicle 105 in a distributed fashion. Thus, the operations of the vehicle control computer 150 may be performed by a single computer or by multiple computers on-board the autonomous vehicle 105.

In some embodiments, the data storage device 175 may contain processing instructions (e.g., program logic) executable by the data processor 170 to perform various methods and/or functions of the vehicle 105, including those described in this patent document. For instance, the data processor 170 executes the operations associated with steering control module 165 for transitioning control of the steering system from the autonomous vehicle operation to the driver. The data storage device 175 may contain additional instructions as well, including instructions to transmit data to, receive data from, interact with, or control one or more of the vehicle drive subsystem 142, the vehicle sensor subsystem 144, the vehicle control subsystem 146, and the workflow management server 102.

Figure 2:
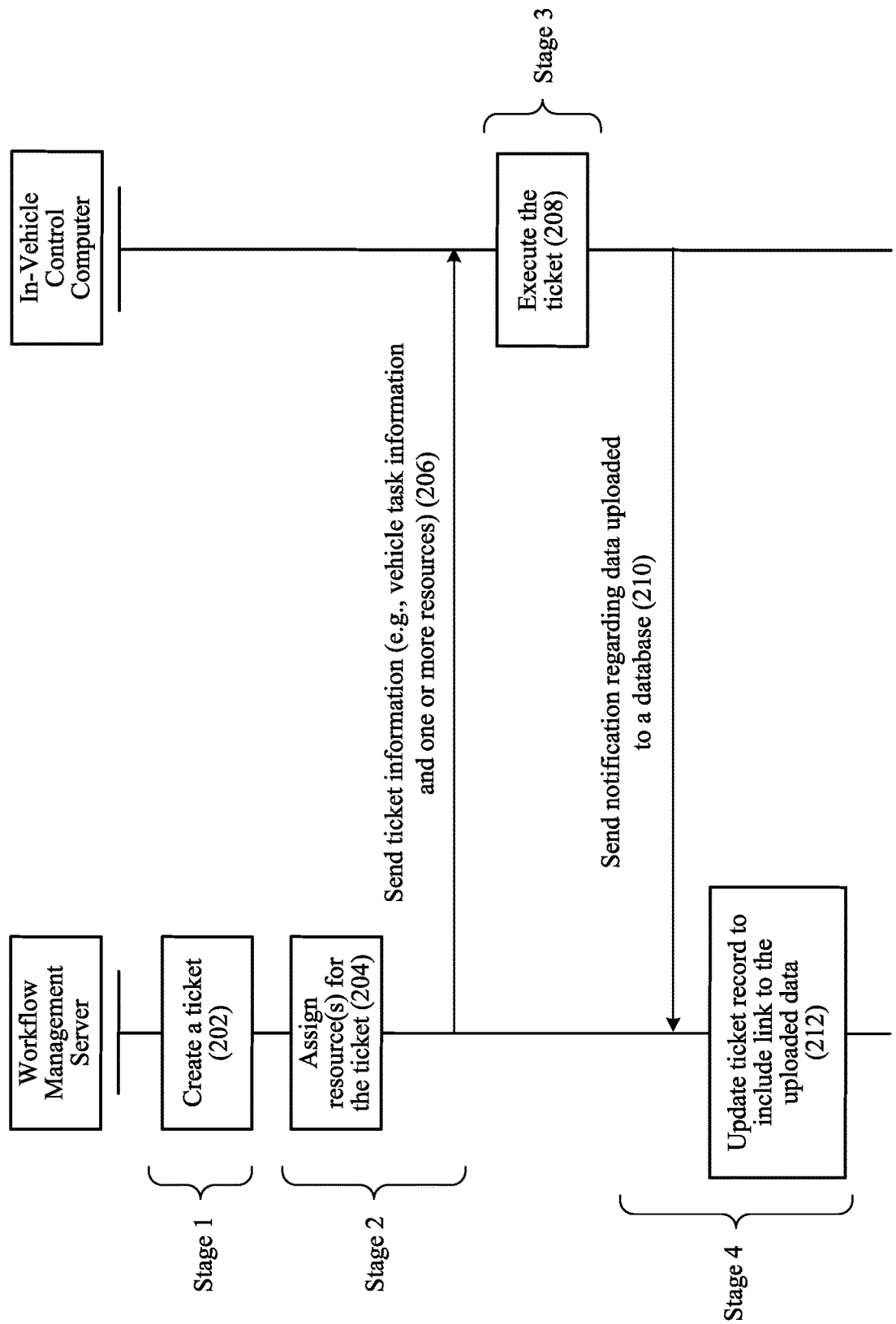
FIG. 2 describes a workflow process managed by a workflow management server and a vehicle control computer.

The vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146) and based on vehicle task information and resources information received from the workflow management server 102 (as further explained in FIG. 2). For example, when an autonomous vehicle 105 is parked, the vehicle control computer 150 may receive information from the workflow management server 102 to configure vehicle control computer 150 to perform a task indicated in the received information.

The vehicle control computer 150 operates the autonomous vehicle 105 based on the information received from the workflow management server 102. When operating the autonomous vehicle 105, the vehicle control computer 150 may use input from the vehicle control system 146 in order to control the steering system to avoid an obstacle detected by the vehicle sensor subsystem 144 and the steering control module 165, move in a controlled manner, or follow a path or trajectory based on output generated by the steering control module 165. As further explained in FIG. 2, the workflow management server 102 may send the path information or the destination information to the vehicle control computer 150. In an example embodiment, the vehicle control computer 150 can be operable to provide control over many aspects of the vehicle 105 and its subsystems.

The workflow management system 100 provides several technical and/or logistical benefits. For example, the workflow management system 100 can be used to test hardware and/or software in the autonomous vehicle 105. In this example, the workflow management system 100 can provide a platform for software developers, test engineers, and operations teams to collaborate and coordinate the testing and development of the hardware and/or software operated on the autonomous vehicle 105. Thus, the workflow management system 100 can allow multiple teams of individuals to perform their respective tasks to test and develop autonomous vehicle operations.

FIG. 2 describes a workflow process managed by a workflow management server and a vehicle control computer described in FIG. 1. The workflow process can be described in four stages. Stage 1 involves a create stage 202 where the workflow management server creates a record of a ticket that includes vehicle task information to enable an autonomous vehicle to perform a task. At the backend, the workflow management server can generate a record of the ticket and collect information for the ticket, and at the frontend, the workflow management server can render a graphical user interface (GUI) through which a person can provide vehicle task information for the ticket record.

A ticket can be considered a request for one or more tasks to be performed by an autonomous vehicle. The GUI can be setup to provide a person with an option to create two or more types of tickets (e.g., in a drop down list that identifies the two or more types of tickets). A first type of ticket can be a data collection related ticket where a person (e.g., a software developer) requests an autonomous vehicle to operate on a road and to collect sensor data from one or more sensors indicated in the ticket record. The collected sensor data may later be analyzed or used by the software developer to improve his or her software code. In some embodiments, if a person selects a data collection ticket type, the GUI may request the person to identify one or more sensors whose sensor data is to be collected. A second type of ticket can be an autonomous driving test related ticket where a person (e.g., a software developer) requests to test his or her revised software code on an autonomous vehicle operating in the real-world, where the revised software code is part of the operating system. In some embodiments, a third type of ticket can be an autonomous vehicle delivery ticket where a person (e.g., operations manager) requests for an autonomous vehicle to deliver goods to a destination.

When a person initiates a process to create a ticket record, the person may provide the workflow management server with vehicle task information for the ticket. The vehicle task information describes a task to be performed with an autonomous vehicle. The vehicle task information may include a type of ticket (e.g., data collection, autonomous driving test, or autonomous vehicle delivery), an identification of the ticket creator, a description of the task to be performed (e.g., collect LiDAR data, testing operating system version 2.0, etc.), optional map related information, information related to a route on which the autonomous vehicle is to perform the task (e.g., starting location and destination), an optional load information of the load to be carried by the autonomous vehicle, and/or other information (e.g., one or more sensors whose data is to be collected if the type of ticket is data collection). In some embodiments, for the autonomous driving test ticket, the vehicle task information provided by a person may also include an identification of an operating system to be used by the autonomous vehicle (e.g., version number or the operating system code or a link to the operating system code). When a workflow management server receives an indication that a person wants to create a ticket with the vehicle task information, the workflow management server generates the ticket with the provided vehicle task information and assigns or adds a unique identifier number or value to that ticket.

In some embodiments, one or more persons can operate one or more computers in communication with the workflow management server to provide information to the workflow management server. The information provided by a person via the GUI can be sent to the workflow management sever via an HTTP request when a user clicks, for example, a "submit" button on the GUI to indicate that he or she wants to create a ticket (or assign the ticket in Stage 2 as further explained below) with the provided information. Upon receiving an indication that a person wants to create or assign a ticket (e.g., by receiving the HTTP request), the workflow management server generates the ticket or assigns the generated ticket with the information received by the workflow management server. The GUI can also be used to update the information provided to the workflow management server prior to the execution of the ticket in Stage 3.

Stage 2 involves an assign operation 204 and the sending operation 206. At the assign operation 204, the workflow management server is used to assign or identify resources for the created ticket to execute the ticket at Stage 3. For example, a person (e.g., an operations manager) may use the GUI that may be rendered by the workflow management server to add or identify one or more of the following resources to the created ticket record: a driver to operate or manage the autonomous vehicle where the driver can be identified based on the driver's schedule, a time when the ticket is to be executed (e.g., when the task is to be performed) or a range of time within which the ticket is to be executed, a unique identifier of an autonomous vehicle (e.g., a license number or a unique number) that identifies the autonomous vehicle to be used from a fleet of multiple autonomous vehicles, and/or vehicle configuration information that provides hardware and/or software configuration information to be used by the autonomous vehicle when it executes the ticket.

In some embodiments, the workflow management server may include a vehicle schedule module (shown as 425 in FIG. 4) to identify or select one or more autonomous vehicle from a fleet of autonomous vehicles so that one of the selected autonomous vehicle(s) can be used to perform the task or are capable of performing the task. In a conventional workflow management system, it is difficult to identify from a fleet of vehicles one or more vehicles that may be the best to perform a task at least because there are several variables that need to be analyzed to identify the vehicle(s) best suited to perform the task. The exemplary vehicle schedule module can select one or more autonomous vehicles to perform a task by matching at least some of the vehicle task information with attributes of the autonomous vehicles in a fleet and/or by determining or obtaining the most recent health information of the autonomous vehicles in the fleet. In some embodiments, the selected one or more autonomous vehicles may be shown in GUI at Stage 2 so that a person assigning resources to the task may select one of the one or more autonomous vehicles identified by the vehicle schedule module as being suited to perform the task. In an example implementation, the selected one or more autonomous vehicles may be shown in a drop-down list with their corresponding unique identifiers.

In some embodiments, the vehicle schedule module can identify one or more autonomous vehicle from a fleet of autonomous vehicles by matching one or more vehicle task information with one or more attributes of the autonomous vehicles in the fleet. The vehicle schedule module can store a table of one or more attributes for each autonomous vehicle so that one or more attributes can be compared to one or more vehicle task information in a ticket record. For example, if the vehicle task information indicates that the task is for a vehicle to travel a one-way distance of 250 miles with a load of 6500 lb., then the vehicle schedule module can use its stored table to identify one or more autonomous vehicles that can operate at a distance greater than or equal to 250 miles with a load greater than or equal to 6500 lb. In another example, if the vehicle task information indicates that the task is for a vehicle to be operate with a LiDAR sensor, then the vehicle schedule module can identify using its stored table one or more autonomous vehicles that include a LiDAR sensor.

In some embodiments, the vehicle schedule module can also identify one or more autonomous vehicle from a fleet of autonomous vehicles by determining or obtaining the most recent health of the autonomous vehicles in the fleet. The health status information can indicate an overall condition of various devices operating on an autonomous vehicle from a previous trip or task (e.g., good, moderate, or poor). At the end of each trip, a health status module (shown as 168 in FIG. 1) in the vehicle control computer may send to the vehicle schedule module an overall health status indicator that indicates the condition of the autonomous vehicle for the next task or trip. Thus, in an example implementation, a vehicle schedule module can identify one or more autonomous vehicles from a fleet if those vehicles have an overall health status of "good" or "moderate."

In some embodiments, the health status module can also send to the vehicle schedule module the individual health status of the devices in the autonomous vehicle. In such embodiments, the health status of the autonomous vehicle can include health data of devices such as central processing units (CPUs), graphic processor units (GPU), hard drives or memory, cameras, LiDARs, global positioning system (GPS) units, etc., For each device operating on the autonomous vehicle, the health data may include (1) an amount of time that the device operated during the trip, (2) an operation percentage (an amount of time that the device operated divided by a total trip time), (3) average, minimum, and/or maximum temperature, (4) a total power consumption, (5) a number of times the device experienced an error condition (e.g., if the device malfunctions), and/or (6) a number of times the device recorded a warning condition from operating in a condition that exceeds a pre-determined limit (e.g., operating at a high temperature).

The vehicle schedule module can store a table of the most recent health status of the autonomous vehicle in a fleet so that the vehicle schedule module can only select those autonomous vehicle(s) that meet a health criterion (e.g., health status is good or moderate). In some embodiments, vehicle schedule module may store a single table that can include both the attributes of the autonomous vehicles (as described above) and the health status of the autonomous vehicles.

The resources added at Stage 2 can include a vehicle configuration information that includes an identification of the operating system to be used by the autonomous vehicle to execute the ticket. An identification of the operating system can include the operating system code, the version number of the operating system, or a link to the operating system. For example, if a software developer wants to test a revised operating system, the person that performs the assigning operation at Stage 2 may include the revised operating system code or a version number associated with the revised operating system code into the GUI as part of the vehicle configuration information. In another example, if a software developer created a data collection ticket during Stage 1, then another person at Stage 2 can identify the operating system version that is to be used to collect sensor data.

In some embodiments, the person assigning or identifying resource(s) for a created ticket may adjust the operation of one or more sensors on the autonomous vehicle based on the vehicle task information. For example, if a data collection ticket indicates that a software developer only wants to collect images from a front camera, the person assigning or identifying resource(s) for the ticket may use the GUI to indicate to the vehicle control computer that the cameras other than the front camera can be disabled when the ticket is executed by the vehicle control computer.

In another example, if an autonomous vehicle delivery ticket indicates that goods are to be delivered from one location to another location at a certain time in the day, and if a person assigning or identifying resource(s) for the ticket determines that the autonomous vehicle need not use its LiDAR sensor during the delivery, then the person may use the GUI to indicate to the vehicle control computer that the LiDAR sensor is disabled. In some embodiments, the GUI provided by the workflow management server may include a checkbox corresponding to each sensor to allow the person assigning or identifying resource(s) for the ticket to individually enable or disable sensors on the autonomous vehicle. In some embodiments, the workflow management server may automatically determine which sensors to enable or disable based on the time of the day and/or weather conditions when the ticket is to be executed.

After the resource(s) for the ticket are assigned or identified, the ticket is finalized or submitted for execution via the GUI (e.g., by having the person click the "assign" or "complete" button). After the ticket is finalized, the ticket is ready for execution. When the person submits the ticket for execution, the finalized ticket including the vehicle task information and the assigned resources is sent to the vehicle control computer at the sending operation 206 as shown in FIG. 2. In some embodiments, the workflow management server can send the vehicle task information and the resources information to the vehicle control computer via a HTTP request. In some embodiments, the workflow management server may send the ticket related information to the vehicle control computer when the autonomous vehicle is parked in a facility. In some embodiments, after a person finalizes or submits the ticket for execution via the GUI, the workflow management server can send a message to an email address of the driver to inform the driver of the ticket assigned to the driver.

Stage 3 involves an execution stage 208 where a driver at least initially operates the autonomous vehicle to setup the autonomous vehicle to execute the assigned ticket. For example, when the driver turns on the autonomous vehicle, the workflow ticket module in the vehicle control computer receives the ticket and determines that a ticket is assigned to the autonomous vehicle. The workflow ticket module may display a prompt on a screen associated with the vehicle control computer, where the prompt indicates to the driver that he or she can select an option to execute or perform the task associated with the ticket (e.g., by clicking on the "execute" or "perform" button on the prompt). In some embodiments, after the driver selects the option to execute the ticket, the driver may not need to perform additional operations since the autonomous driving module (180 in FIG. 1) can take control and drive the vehicle autonomously to or close to a destination indicated in the route information.

When the workflow ticket module (165 in FIG. 1) in the vehicle control computer receives the vehicle configuration information (and other information) from the ticket, the workflow ticket module can configure the vehicle control computer and the hardware/software on the autonomous vehicle to operate based on the information in the ticket record without requiring additional input from the driver. For example, when the driver selects an option to execute the task on a displayed prompt, the workflow ticket module can determine from the ticket that the type of the record relates to performing a driving test using a revised operating system. If the type of record relates to a driving test, then the workflow ticket module may either obtain the revised operating system from the vehicle configuration information in the ticket record or may download the revised operating system from a server based on the revised operating system version number provided by the vehicle configuration information. The workflow ticket module can execute the revised operating system to operate the autonomous vehicle based on the information (e.g., route information) provided in the ticket.

In another example, when the driver selects an option to execute the task on a displayed prompt, the workflow ticket module can determine from the ticket that the type of the record relates to data collection. If the type of record relates to a data collection, then the workflow ticket module can record data from the one or more sensors indicated in the record while the autonomous vehicle is driven towards the destination. The workflow ticket module can also upload the recorded data to the database after the ticket has been executed.

In some embodiments, the workflow ticket module can also send instructions to one or more sensors to enable or disable them based on information provided by the vehicle configuration information in the ticket record. Sensors can be enabled or disabled for both the driving test or the data collection related tickets. Thus, the vehicle control computer receiving the vehicle configuration information is an advantageous technical feature at least because the vehicle control computer can automatically configure the autonomous vehicle as desired without requiring the driver to perform the necessary configurations.

After the driver selects to execute the assigned ticket, the workflow ticket module can configure the vehicle control computer by using the assigned operating system. The workflow ticket module can also enable or disable one or more sensors as indicated in the vehicle configuration information via the vehicle subsystem interface (160 in FIG. 1). Based on the ticket record, the workflow ticket module can provide the route information to the autonomous driving module (180 in FIG. 1) that can operate the various vehicle subsystems of the autonomous vehicle to drive the autonomous vehicle up to or close to a destination. The workflow ticket module may also provide on the screen a map of the route to be taken by the autonomous vehicle. In some embodiments, if the ticket record received by the workflow ticket module indicates that the ticket is for a data collection, then the workflow ticket module can record sensor data from one or more sensors indicated in the ticket. Thus, the vehicle control computer operates the autonomous vehicle based on the vehicle task information and the resources indicated by the ticket assigned to the autonomous vehicle.

Stage 4 involves a finish ticket stage 210, 212. After the autonomous vehicle executes the ticket and drives on a route and/or using a configuration indicated by the ticket record, the workflow ticket module can determine whether the autonomous vehicle has reached the destination using the route information provided by the vehicle task information and the GPS position information of the autonomous vehicle. For example, the workflow ticket module can determine that the autonomous vehicle has reached its destination by determining that the GPS position information of the autonomous vehicle is within a pre-determined distance (e.g., 0.5 miles) of the destination information included in the ticket record. In another example, a workflow ticket module can display a button (e.g., "task complete" button) on a screen associated with the vehicle control computer so that a person (e.g., a driver) can select the button to indicate that the autonomous vehicle has reached its destination and that the task has been executed.

After the workflow ticket module determines that the autonomous vehicle has reached its destination, the workflow ticket module can add an indication in a ticket status field in the ticket assigned to the autonomous vehicle, where the indication (e.g., the words "completed" or a check flag) indicates that the ticket has been executed. After the autonomous vehicle is driven back to and parked at the facility where it began, if the ticket is a data collection ticket, the workflow ticket module can upload sensor data to a database associated with the workflow management server. The workflow ticket module can also upload the ticket status information (e.g., the indication that the ticket has been executed or completed) to a database associated with the workflow management server after the autonomous vehicle is parked at the facility where it began. The workflow ticket module can also upload to the database the health status related information of the vehicle and/or the devices in the vehicle as described in this patent document.

In some embodiments, the workflow ticket module can upload sensor data, health status information, and/or ticket status information in response to determining that the GPS position of the autonomous vehicle is within a pre-determined distance (e.g., 0.2 miles) of the starting location indicated in the ticket record, where the starting location can be the address of the facility where the autonomous vehicle was parked before it executed the ticket. In some embodiments, the workflow management server updates the executed ticket to include a link where the sensor data is uploaded and the ticket status information.

Figure 3:
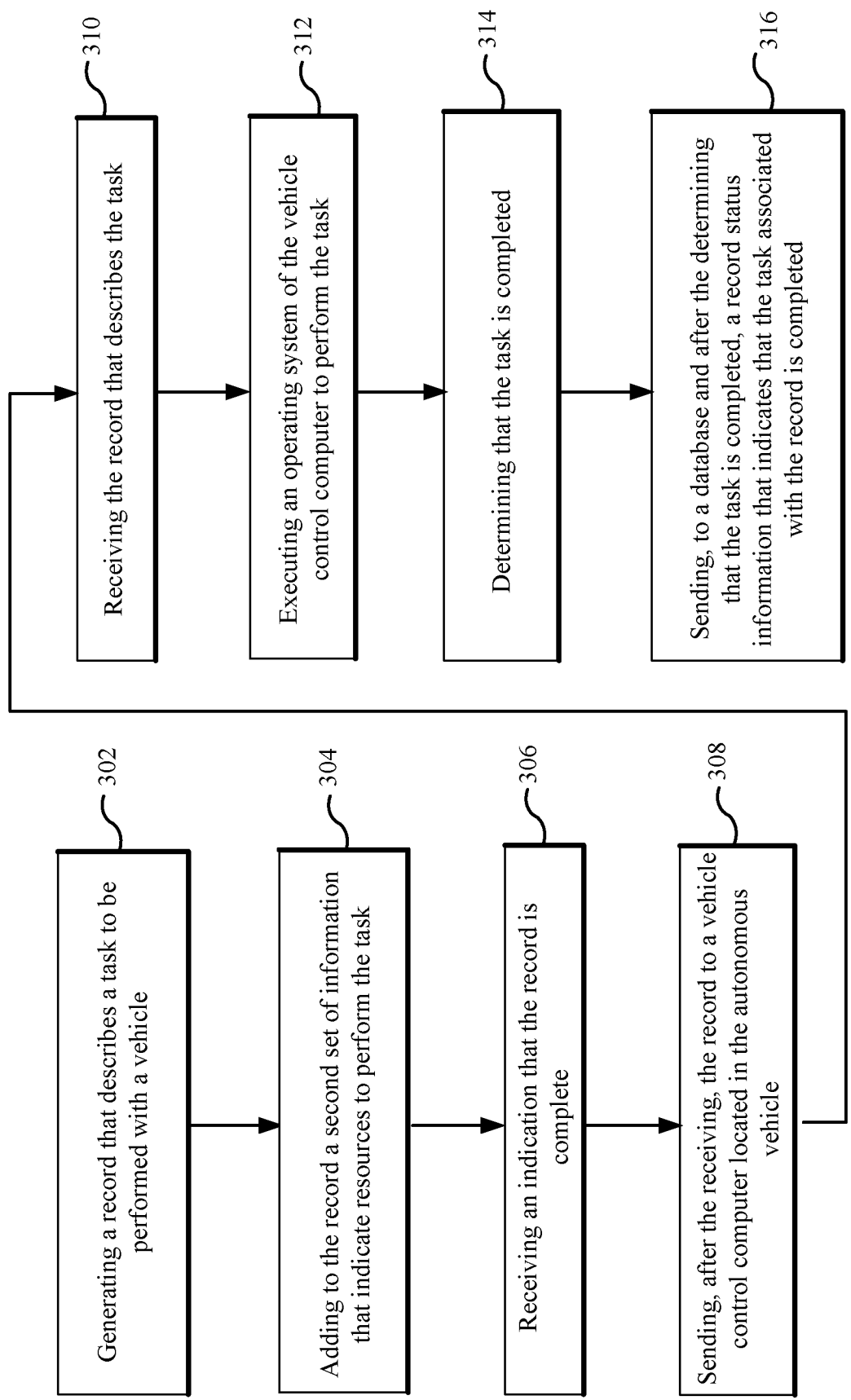
FIG. 3 is an example flowchart of workflow process to operate a vehicle.

FIG. 3 is an example flowchart of workflow process to operate a vehicle. Operations 302 to 308 can be performed by the record generation and management module (shown as 430 in FIG. 4) of a workflow management server. Operations 310 to 316 can be performed by the workflow ticket module (shown as 165 in FIG. 1) of a vehicle control computer located in a vehicle.

At the generating operation 302, the workflow management server generates a record that describes a task to be performed with a vehicle. The record includes a first set of information that may include a starting location and a destination of a route on which the vehicle is to perform the task. At the adding operation 304, the workflow management server adds to the record a second set of information that indicate resources to perform the task. The second set of information can include a unique identifier of the vehicle. At the receiving operation 306, the workflow management server receives an indication that the record is complete. At the sending operation 308, the workflow management server sends, after the receiving operation 306, the record to a computer located in the vehicle.

At the receiving operation 310, the computer receives the record that describes the task. At the executing operation 312, the computer executes an operating system of the computer to perform the task, where the operating system is executed to operate the vehicle to drive towards the destination indicated in the record. At the determining operation 314, the computer determines that the task is completed. At the sending operation 316, the computer sends, to a database and after the determining that the task is completed, a record status information that indicates that the task associated with the record is completed. In some embodiments, the record status information can include the health status of the devices that operate on the vehicle.

In some embodiments where task relates to collecting sensor data, the first set of information further includes a type of the record that indicates that the task relates to collecting sensor data, and one or more sensors on the vehicle identified for data collection. In such embodiments, the second processor operable to execute the instruction code to implement another method further comprises: upon determining, from the type of record, that the task relates to collecting sensor data: recording data from the one or more sensors indicated in the record while the vehicle is driven towards the destination, and uploading the recorded data to the database.

In some embodiments where task relates to performing a driving test using the operating system indicated in the record, the record includes an identification of the operating system to be used by the vehicle to perform the task, the operating system indicated in the record is a revised operating system, the first set of information further includes a type of the record that indicates that the task relates to performing a driving test using the operating system indicated in the record. In such embodiments, the second processor operable to execute the instruction code to implement another method further comprises: upon determining, from the type of record, that the task relates to performing a driving test using the operating system indicated in the record: obtaining the operating system indicated in the record before executing the operating system.

In some embodiments, the first processor of the workflow management server is operable to implement the method that further comprises: determining, from a plurality of vehicles, one or more vehicles capable of performing the task, where the one or more vehicles are determined based on a comparison of the first set of information with attributes of the plurality of vehicles or based on a health status information indicative of an overall condition of each of the plurality of vehicles, and where the vehicle is added to the record from the determined one or more vehicles.

In some embodiments, the second set of information further includes one or more enable or disable information that respectively indicates to the computer to enables or disables one or more sensors in the vehicle, and where the second processor operable to execute the instruction code to implement another method further comprises: enabling or disabling one or more sensors of the vehicle based on the one or more enable or disable information. In some embodiments, the second processor operable to execute the instruction code to implement another method further comprises: sending, to the database and after the determining that the task is completed, health information of devices located on or in the vehicle.

In some embodiments, the second set of information further includes either a time when the task is to be performed or a range of time period within which the task is to be performed. In some embodiments, the second set of information further includes a driver to manage the vehicle. In some embodiments, the task is determined to be completed in response to determining that a position of the vehicle is within a pre-determined distance of the destination indicated in the record. In some embodiments, the operating system is obtained by the computer in response to the computer receiving a second indication to perform the task associated with the record.

Figure 4:
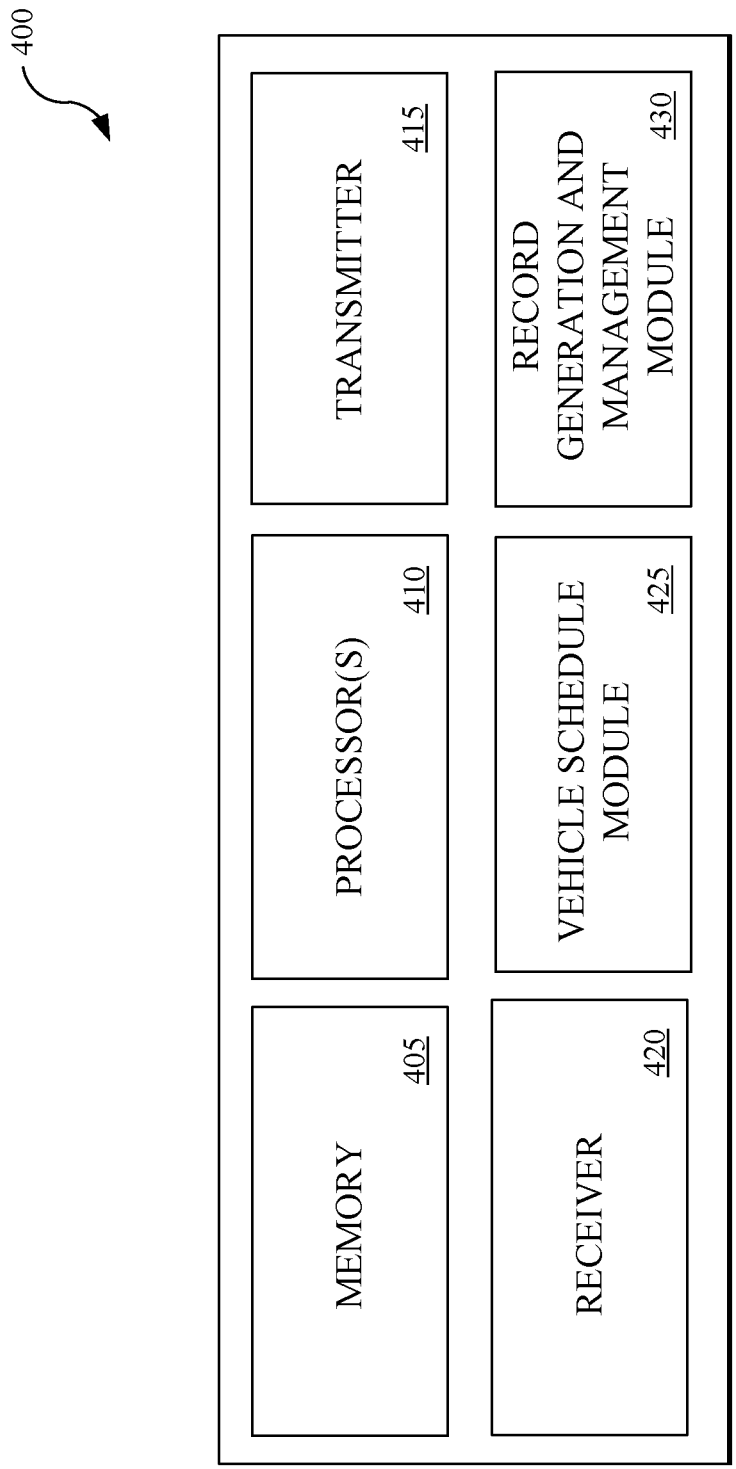
FIG. 4 shows an exemplary block diagram of a workflow management server.

FIG. 4 shows an exemplary block diagram of a workflow management server. The workflow management server 400 includes at least one processor 410 and a memory 405 having instructions stored thereupon. The instructions upon execution by the processor 410 configure the workflow management server 400 to perform the operations described for the workflow management server in this patent document. For example, the instructions upon execution by the processor 410 configure the workflow management server 400 to perform the operations described for the workflow management server in FIGS. 1 to 3 and/or in the various embodiments in this patent document. The workflow management server 400 also includes a transmitter 415 and receiver 420 to respectively send and receive information to another device. For example, the transmitter in the workflow management server can send ticket record information to be received by the receiver in vehicle control computer.

In some implementations, methods described in the various embodiments in this patent document are embodied in a computer readable program stored on a non-transitory computer readable media. The computer readable program includes code that when executed by a processor, causes the processor to perform the respective method associated with the vehicle control computer and the workflow management server described in this patent document, including the method described in FIGS. 2-3. In this patent document, the operations performed by either the vehicle control computer or the workflow management server may be performed by a single computer or server or multiple computers or servers. In this patent document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A system for managing vehicle operation, comprising:
a first computer comprising a first processor configured to:
generate a record comprising task information that includes a description of a task to be performed, wherein the task information indicates that the task information is related to a delivery operation to deliver goods to a destination;
select a vehicle from a plurality of vehicles to perform the task by a comparison that is performed between at least some of the task information and one or more attributes of the plurality of vehicles;
receive information related to one or more resources to add to the record to perform the task; and
send the task information and the information related to the one or more resources to a second computer located in the vehicle in response to a reception of a first indication that the record is complete;
the second computer comprising a second processor configured to:
receive the task information and the information related to the one or more resources;
display a message with an option to perform the task associated with the task information;
cause the vehicle to drive to the destination to perform the task upon a reception of a second indication that the option to perform the task is selected.

2. The system of claim 1, wherein the task information includes an identification of a creator of the task information.

3. The system of claim 1, wherein the task information includes information related to a route on which the vehicle is to perform the task.

4. The system of claim 1, wherein the task information includes a load information of a load to be carried by the vehicle.

5. The system of claim 1, wherein the information related to the one or more resources includes hardware or software configuration of the vehicle when the task is to be performed.

6. The system of claim 1, wherein the one or more attributes of the plurality of vehicles includes driving ranges of the plurality of vehicles or load capacities of the plurality of vehicles.

7. The system of claim 1,
wherein the first processor of the first computer is further configured to receive a third indication that at least one sensor located on the vehicle is enabled or disabled when the task is performed by the vehicle; and
wherein the second processor of the second computer is further configured to send an instruction to enable or disable the at least one sensor located on the vehicle upon the reception of the second indication that the option to perform the task is selected and in accordance with the third indication received by the first computer and sent to the second computer.

8. The system of claim 1,
wherein the first processor of the first computer is further configured to identify sensors located on the vehicle to be enabled or disabled based on a time when the task is to be performed by the vehicle or based on weather conditions when the task is to be performed by the vehicle; and
wherein the second processor of the second computer is further configured to send instructions to enable or disable the sensors located on the vehicle upon the reception of the second indication that the option to perform the task is selected and in accordance with information related to the sensors being enabled or disabled sent by the first computer to the second computer.

9. A method of facilitating a vehicle-related operation, comprising:
generating, by a first computer, a record comprising task information that includes a description of a task to be performed, wherein the task information indicates that the task information is related to a delivery operation to deliver goods to a destination;
selecting, by the first computer, a vehicle from a plurality of vehicles to perform the task by comparing at least some of the task information and one or more attributes of the plurality of vehicles;
receiving, by the first computer, information related to one or more resources to add to the record to perform the task; and
sending, by the first computer, the task information and the information related to the one or more resources to a second computer located in the vehicle in response to receiving a first indication that the record is complete;

displaying, by the second computer, a message with an option to perform the task associated with the task information;

causing, by the second computer, the vehicle to drive to the destination to perform the task upon reception of a second indication that the option to perform the task is selected.

10. The method of claim 9, wherein the record is generated by adding a unique identifier to the record in response to the receiving the first indication that the record is complete.

11. The method of claim 9, wherein the vehicle is selected from the plurality of vehicles by comparing the at least some of the task information with the one or more attributes of the plurality of vehicles and by determining a most recent health information of the plurality of vehicles.

12. The method of claim 11, wherein the most recent health information of at least one vehicle indicates an overall condition of the at least one vehicle from a previous trip or a previous task performed by the at least one vehicle.

13. The method of claim 11, wherein the most recent health information of at least one vehicle indicates health data of a plurality of devices operating on the at least one vehicle, wherein, for each device, the health data includes:

a first number of times that a device experienced an error condition during a previous trip or a previous task performed by the at least one vehicle, and a second number of times the device recorded a warning condition from operating in a condition that exceeded a pre-determined limit during the previous trip or the previous task.

14. The method of claim 13, wherein, for each device, the health data includes an average temperature and a maximum temperature of the device during the previous trip or the previous task.

15. A method of managing vehicle operation, comprising:

receiving, by a second computer located in a vehicle from a first computer located outside the vehicle, a task information and information related to one or more resources to perform a task, wherein the task information indicates that the task information is related to a delivery operation to deliver goods to a destination;

displaying a message with an option to perform the task associated with the task information;

causing the vehicle to drive to the destination to perform the task upon reception of a second indication that the option to perform the task is selected.

16. The method of claim 15, further comprising:

sending, to the first computer, information that indicates that the task has been completed in response to determining that a location of the vehicle is within a pre-determined distance of the destination.

17. The method of claim 15, wherein the information related to the one or more resources includes an identification of a driver to operate or manage the vehicle.

18. The method of claim 15, wherein the information related to the one or more resources includes a time or a range of times within which the task is to be performed by the vehicle.

19. The method of claim 15, wherein the information related to the one or more resources includes an identifier that specifically identifies the vehicle to perform the task from a plurality of vehicles.

20. The method of claim 15, further comprising:

sending health status information of the vehicle or of devices in the vehicle in response to determining that a location of the vehicle is within a pre-determined distance a starting location indicated in the task information.

* * * * *